United States Patent
Paros et al.

(10) Patent No.: US 6,497,152 B2
(45) Date of Patent: Dec. 24, 2002

(54) METHOD FOR ELIMINATING OUTPUT DISCONTINUITIES IN DIGITAL PRESSURE TRANSDUCERS AND DIGITAL PRESSURE TRANSDUCER EMPLOYING SAME

(75) Inventors: Jerome M. Paros, Kirkland, WA (US); Theo P. Schaad, Seattle, WA (US)

(73) Assignee: Paroscientific, Inc., Redmond, WA (US)

( * ) Notice: Subject to any disclaimer, the term of this patent is extended or adjusted under 35 U.S.C. 154(b) by 3 days.

(21) Appl. No.: 09/792,324

(22) Filed: Feb. 23, 2001

(65) Prior Publication Data

US 2002/0117006 A1 Aug. 29, 2002

(51) Int. Cl.$^7$ .................................................. G01L 9/00
(52) U.S. Cl. ........................................................ 73/717
(58) Field of Search ........................ 73/717, 704, 862, 73/756, 861; 310/321

(56) References Cited

U.S. PATENT DOCUMENTS

| | | |
|---|---|---|
| 3,238,789 A | 3/1966 | Erdley |
| 3,470,400 A | 9/1969 | Weisbord |
| 3,479,536 A | 11/1969 | Norris |
| 4,215,570 A | 8/1980 | EerNisse ................... 73/141 R |
| 4,321,500 A | 3/1982 | Paros et al. .................. 310/321 |
| 4,372,173 A | 2/1983 | EerNisse et al. ......... 73/862.59 |
| 4,382,385 A | 5/1983 | Paros ........................... 73/702 |
| 4,384,495 A | 5/1983 | Paros ...................... 73/862.59 |
| 4,406,966 A | 9/1983 | Paros ........................... 310/321 |
| 4,415,827 A | 11/1983 | Chuang ....................... 310/370 |
| 4,445,065 A | 4/1984 | Albert ......................... 310/321 |
| 4,448,546 A | 5/1984 | Paros ........................... 374/117 |
| 4,455,874 A | 6/1984 | Paros ........................... 73/704 |
| 4,469,979 A | 9/1984 | Chuang ....................... 310/370 |
| 4,479,385 A | 10/1984 | Koehler .................... 73/517 R |
| 4,526,247 A | 7/1985 | EerNisse et al. ....... 177/210 FP |
| 4,531,073 A | 7/1985 | EerNisse ..................... 310/370 |
| 4,656,383 A | 4/1987 | Albert ......................... 310/321 |
| 4,658,174 A | 4/1987 | Albert ......................... 310/323 |
| 4,658,175 A | 4/1987 | Albert ......................... 310/323 |
| 4,724,351 A | 2/1988 | EerNisse et al. ............ 310/328 |
| 4,743,790 A | 5/1988 | Albert ......................... 310/321 |
| 4,751,849 A | 6/1988 | Paros et al. .............. 73/862.59 |
| 4,757,228 A | 7/1988 | Kalinoski et al. ........... 310/316 |
| 4,838,369 A | 6/1989 | Albert ................... 177/210 FP |
| 4,912,990 A | 4/1990 | Norling ................... 73/862.59 |
| 4,980,598 A | 12/1990 | Albert ......................... 310/321 |
| 5,109,175 A | 4/1992 | Albert ......................... 310/321 |
| 5,334,901 A | 8/1994 | Albert et al. ............... 310/321 |
| 5,596,145 A | 1/1997 | Albert et al. ............. 73/514.29 |
| 5,696,323 A | 12/1997 | Hulsing, II .............. 73/504.12 |
| 5,962,784 A | 10/1999 | Hulsing, II .............. 73/504.03 |
| 5,974,879 A | 11/1999 | Hulsing, II ................ 73/504.3 |

Primary Examiner—Benjamin R. Fuller
Assistant Examiner—Marissa Ferguson
(74) Attorney, Agent, or Firm—Dorsey & Whitney LLP (57) ABSTRACT

Digital pressure transducers employing force-sensitive resonators are designed according to a method that eliminates spurious mode resonances. The dimensional and geometrical relationships of the force-producing pressure elements and structures are chosen such that spurious modes of oscillation are not excited by the resonant modes of the force-sensitive resonators.

44 Claims, 7 Drawing Sheets

METHOD FOR ELIMINATING OUTPUT DISCONTINUITIES IN DIGITAL PRESSURE TRANSDUCERS AND DIGITAL PRESSURE TRANSDUCER EMPLOYING SAME

TECHNICAL FIELD

This invention relates to pressure transducer designs and methods for selecting the dimensions and geometry of force-producing pressure elements such that spurious modes of oscillation do not coincide with the frequencies generated by force-sensitive resonators that are used to measure the applied pressures.

BACKGROUND OF THE INVENTION

Figure 1:
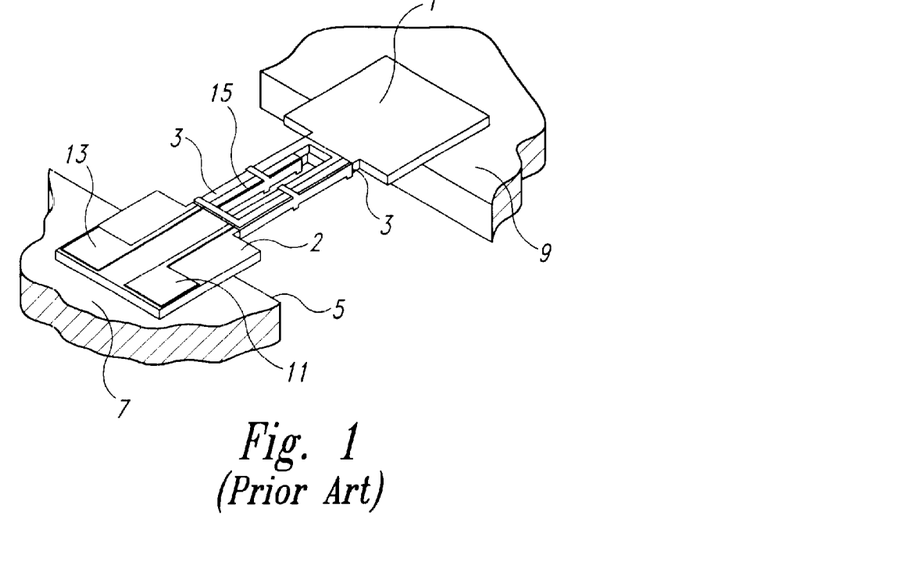
FIG. 1 is an isometric view illustrating a conventional load-sensitive Double-Ended Tuning Fork (DETF) sensor.

A number of force-sensitive resonators are described in the prior art. Single vibrating beam force sensors are described in U.S. Pat. Nos. 3,470,400, 3,479,536, 4,445,065, 4,656,383, 4,658,174, 4,658,175, 4,743,790, 4,980,598, 5,109,175, and 5,596,145. Double vibrating beam force sensors, referred to as Double-Ended Tuning Forks (DETF), are described in U.S. Pat. Nos. 3,238,789, 4,215,570, 4,415,827, 4,469,979, 4,531,073, 4,757,228, and 4,912,990. Each of these patents describes a resonator to which a force, which may be induced by pressure, is applied. The force alters the resonant frequency of the resonator so that the frequency of oscillation is indicative of the magnitude of the applied force. FIG. 1 is an isometric view of a force-sensitive transducer made with a conventional Double-Ended Tuning Fork (DETF), as described in U.S. Pat. No. 4,372,173. The DETF includes a pair of parallel beams 3 extending between a pair of mounting pads 1, 2. The mounting pads 1, 2 are attached to respective mounting structures 9, 7 by suitable means. Axial forces, applied along a longitudinal axis of the transducer extending between the mounting pads 1, 2 stress the beams 3, thereby changing the resonant frequency at which they vibrate in accordance with the magnitude of the applied force. The beams 3 are preferably fabricated using a piezoelectric material, such as quartz, and they are driven through piezoelectric excitation by an electrode pattern 15 placed on the beams 3. The electrode pattern 15 is coupled to contacts 11, 13 formed on the mounting pad 2, which are, in turn, coupled to oscillator circuitry (not shown). The oscillator circuitry is designed to drive the beams 3 at their resonant frequency. Alternative means of excitation include passing an electrical current at the resonant frequency through the beams in a magnetic field or capacitive drive means. The transducer achieves low energy loss because most reactive moments and forces which might be transmitted to the mounting structures 7, 9 are cancelled by the beams 3 being driven 180 degrees out of phase.

The resonant frequency $f_o$ of the unstressed double-ended tuning fork beam of length L, tine thickness in the direction of vibration t, tine width b, modulus of elasticity E, and density d, is given by the formula:

$$f_o = (\text{constant})(t/L^2)\sqrt{(E/d)}$$

Figure 2:
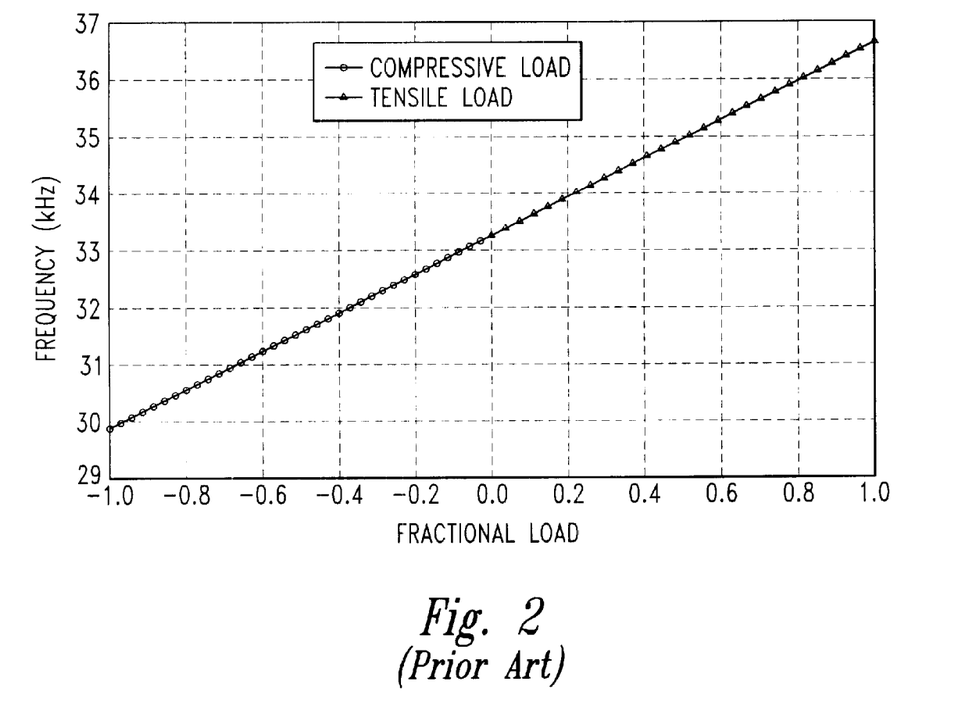
FIG. 2 is a graph that shows the frequency output of a load-sensitive resonator under compressive and tensile load.

FIG. 2 is a graph that shows the change of the resonant frequency as a function of applied load. If the load is in compression, the resonant frequency decreases. Under tensile load, the resonant frequency increases. The resonator in the shown example changes frequency by approximately 10% under full-scale load.

Although the resonant frequency is generally a non-linear function of the applied load F, the change in frequency under load may be approximated by:

$$f = f_o \sqrt{(1 + a^* F)}$$

Where $$a = (\text{constant}) L^2 / (E^* t^3 {}^* b)$$

The load on the resonator may be either compressive or tensile, causing a frequency decrease or increase, respectively. Thus the sign of the constant a can be positive or negative. The resonant frequency, f, will vary between a minimum, fmin, and a maximum, fmax, corresponding to the minimum and maximum applied loads.

The applied load also generates compressive or tensile stress σ in the resonator beams (n=2 for double-ended tuning forks), the magnitude of which is given by the formula:

$$\sigma = F/(n^* b^* t)$$

The resultant stresses must be within the elastic limits of the material and, when the transducer is used in compression, within the buckling limits of the material. The transducer is preferably highly sensitive and is stressed up to acceptable values, which defines the maximum load, Fmax, either in tension or compression. By the formulas given above, a corresponding frequency range of the resonator is found from the unstressed resonant frequency fo to the stressed frequencies fmax and fmin at the highest tensile and compressive loads on the resonator.

Various techniques have been employed to maximize the Q of these force-sensitive resonators by reducing the amount of energy lost through their mountings to the force-producing elements and structure. Flexurally vibrating beams, known as "fixed-fixed" beams, lose energy to the structure on which they are mounted when their reactive forces and moments are not perfectly balanced or filtered effectively. Vibration isolation systems act as low-pass mechanical filters to reduce the amount of lateral flexural energy lost by single beam resonators, as described in U.S. Pat. Nos. 3,470,400, 4,656,383, 4,658,174, 4,658,175, 4,743,790, 4,838,369, 4,980,598, 5,109,175, and 5,334,901. Double-Ended Tuning Forks (DETF) depend on the cancellation of lateral forces and moments between two symmetric beams vibrating in 180 degrees phase opposition.

Lateral flexing of vibrating beam resonators causes a longitudinal shortening for each half of a flexing cycle, therefore generating longitudinal pumping forces at twice the lateral flexing frequency. These pumping forces transfer energy to the structure on which the beams are mounted, thereby reducing the Q of such resonators. U.S. Pat. No. 4,321,500 discloses an isolation system that reduces the magnitude of such longitudinal pumping. U.S. Pat. No. 4,724,351 describes DETF sensors that are configured to minimize the longitudinal pumping by making the beams vibrate symmetrically.

U.S. Pat. No. 4,372,173 discloses a geometrical and dimensional selection process for force-sensitive resonators, which avoids spurious modes of oscillation within the resonator itself that would otherwise result in output discontinuities over the operational force range. However, even if these internal spurious modes of the resonator are avoided, residual lateral and longitudinal forces and moments remain due to imperfections in the manufacturing processes and the inability of mechanical isolation systems to totally eliminate these imbalanced forces and moments. Thus, force-sensitive resonators, including those designed according to the teachings of U.S. Pat. No. 4,372,173, apply lateral forces and moments at resonant frequency, f, and longitudinal forces and moments at double frequency, 2f, to the resonator mounting pads and thence to the force-producing structure.

To a lesser degree, and dependent on mounting accuracies, the resonant frequency, f, can also be transmitted in the longitudinal direction, and the double frequency, 2f, can be transmitted in the lateral direction to the force-producing structure. As described in the U.S. Pat. No. 4,384,495, the DETF sensors must be symmetrically loaded to prevent spurious modes of oscillation that result from load-dependent differences in resonant frequencies of each beam overcoming the coupling between the two beams.

If the frequencies of the resonator's lateral and longitudinal forces and moments that are transmitted to the force-producing mechanism coincide with resonant frequencies of the force-producing mechanism, then enough energy can be lost from the resonator to produce discontinuities in output over the operating range. Indeed, enough energy could be lost to cease oscillation of the resonator. Even if insufficient energy is lost to stop the resonator from oscillating, the resonant force-producing mechanism has a tendency to "pull" the resonant frequency of the resonator toward the resonant frequency of the force-producing mechanism when the resonant frequency of the resonator is close to the resonant frequency of the mechanism. This phenomenon produces a discontinuity in the relationship between the resonant frequency of the resonator and the force that is being measured by the resonator. As a result, the resonator exhibits areas of reduced accuracy when it oscillates near the resonant frequency of the force-producing mechanism.

A number of transducers have been developed which employ force-sensitive resonators to measure pressure, temperature, acceleration, angular rate, and loads. Load cells and scales employing resonators are described in U.S. Pat. Nos. 4,526,247, 4,751,849, and 4,838,369. A digital temperature sensor employing a force sensitive resonator is disclosed in U.S. Pat. No. 4,448,546. In these applications, the mechanical impedance mismatches between the resonators and force-producing mechanism are large. The high structural spring rates and correspondingly high structural resonant frequencies allow relatively easy avoidance of spurious resonances which would coincide with the frequencies of oscillation of the force-sensitive resonators.

Accelerometers and rate sensors employing resonators are disclosed in U.S. Pat. Nos. 5,974,879, 5,962,784, 5,696,323, 5,334,901, and 4,479,385. In general, these structures consist of softly suspended proof masses with structural resonant frequencies much lower than those of the force-sensitive resonators.

Pressure transducers and load sensors described in U.S. Pat. Nos. 4,382,385 and 4,406,966 employ soft bellows as the force-producing or isolating elements. Thus, these lower-frequency structural resonances are generally not excited by the lateral and longitudinal oscillations of the force-sensitive resonators. However, pressure transducers as described in U.S. Pat. No. 4,455,874 that employ light-weight structures as the force-producing elements are extremely susceptible to being excited by the lateral and longitudinal pumping of the resonators over the operational pressure range. These structures produce loads under applied pressure that change the frequencies of oscillation of the force-sensitive resonators. The pressure-responsive structures can be of the form of flattened, coiled tubes, commonly referred to as Bourdon tubes. The geometry and dimensions of the force-generating elements in these prior art transducers are such that structural resonances in the Bourdon tubes are excited by the force-sensitive resonators. Such structural excitations and subsequent energy loss produce discontinuities in the resonator output. Structural resonances occur at discrete values and harmonic overtones of the lowest modes. The difficulty of establishing clear zones, i.e., oscillation frequency ranges that will not result in spurious resonances, increases with the requirements of designing high-resolution, extremely sensitive digital pressure transducers because the more sensitive resonators have a larger frequency excursion under full-scale loads. These frequency excursions, being larger, are more likely to overlap resonant frequencies of structures, such as pressure-responsive elements, to which they are attached. Furthermore, the design of the dimensions and geometry of the pressure-responsive elements is constrained so that they generate substantial full-scale loads while being unaffected by the lateral and longitudinal excitation of the force-sensitive resonators.

The problem of resonators exciting structural resonances in Bourdon tubes is not the only problem with such pressure transducers. Another problem is the coupling of energy to mounting structures for the transducer. For example, prior art designs, such as described in U.S. Pat. No. 4,455,874, that employ "U"-shaped Bourdon tubes with pressure inlet ports in the plane of the tubes, easily transmit vibrations to attached base structures. Similarly, pivotally mounted structures as described in U.S. Pat. No. 4,455,874 readily transmit energy between the resonator and Bourdon tube.

Figure 3:
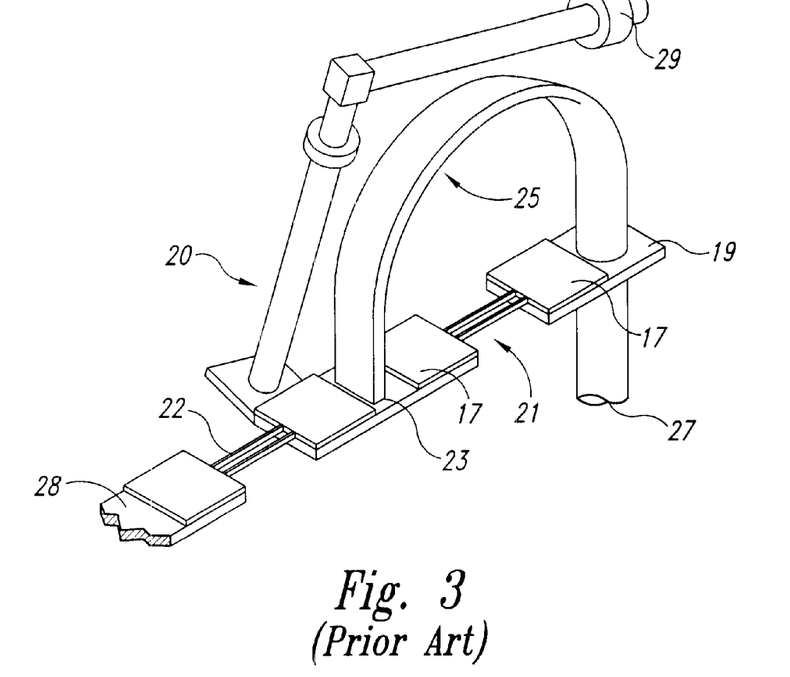
FIG. 3 is an isometric view of a conventional pressure transducer having a load-sensitive resonator mounted to a conventional C-shaped Bourdon tube with a mass-balance arrangement.

In the past, there have been two approaches that have been used with some success to prevent spurious resonances from being generated in Bourdon tube transducers. One approach, which is described with reference to FIG. 3, is to use a mass-balance arrangement that can be adjusted in such a way as to change the resonant frequency of the pressure-sensitive mechanism. With trial and error, it is possible to choose the size and position of the balance weights until frequencies of the resonances move out of range. This approach usually only works with Bourdon tubes that have a coil diameter of less than 1.4 cm. It is well known that the relative spacing of the frequencies of higher harmonics decreases. This is well known in musical instruments as the higher harmonics jump from an octave to a fifth, fourth, third, etc. In a cantilevered beam (the present invention describes pressure-sensitive tubes that are generally curved cantilevered beams with various boundary conditions), the spacing of the first five modes is 3.52, 22 (525%), 61.7 (180%), 121 (96%), 200 (65%), where the increase in frequency percentage-wise becomes increasingly smaller. Depending on the boundary conditions, the spacing typically decreases by 1/n (where n is the mode). For larger devices, the higher harmonics increasingly fall into the range of the resonator frequencies. The present invention is especially useful in making highly sensitive and accurate pressure transducers that are free of output discontinuities with a length of the pressure-responsive element larger than 4 cm.

As shown in FIG. 3, a conventional transducer 20 is formed by a load-sensitive resonator 21 attached to a C-shaped Bourdon tube 25. When pressure is applied to a port 27 of the C-shaped Bourdon tube 25, the tube 25 applies bending forces to the resonator 21. The change in the operating frequency of the oscillator circuitry, which is equal to the resonant frequency of the resonator 21, is indicative of the applied pressure. In the example shown, the resonator 21 is in tension, and the frequency increases as pressure is applied. If, on the other hand, the resonator 21 is repositioned to location 22 so that it is attached between a fixed base 28 and the closed end of the Bourdon tube 23, the load can also be applied in compression, and the resonant frequency would decrease. Depending on the dimensional parameters and material strength, the ratio of generated force to applied pressure can fall over a very wide range. The relationship is well known for most tube designs, as described in "An Elementary Theory of the Bourdon Gage", by Alfred Wolf, Journal of Applied Mechanics, Trans. ASME, Vol. 68, p. A-207, September 1946 and "Elastic Elements of Instruments", by L.E. Andreeva, 1966. A conventional mass-balance arrangement 29 is used, which can be designed to perform two functions. First, the mass-balance arrangement 29 can reduce the sensitivity of the transducer to orientation errors in earth's gravity field. Second, the additional masses are adjusted by trial and error to move spurious resonances of the tube 25 out of the full-scale frequency range of the force-sensitive resonator. The use of a mass-balance arrangement 29 can be satisfactory for relatively small transducers, but it does not work well for larger transducers for reasons that will now be explained further. The fundamental resonant frequency of a pressure-sensitive structure like a Bourdon tube is essentially proportional to the square root of k/m, where k is the stiffness of the structure and m is the mass located at the tip of the structure, which is primarily composed of the mass-balance weights. For larger transducers, i.e., those having a Bourdon tube length in excess of 4 cm, the mass-balance weights located at the ends of the structure become less important because the higher harmonics depend more on the distributed mass of the structure. Consequently, mass-balance weights cannot be used effectively to move resonances in the larger Bourdon tubes.

The second approach to preventing spurious resonances from being generated in Bourdon tube transducers is to design the Bourdon tube so that it does not have a resonant frequency within the range of resonant frequencies of the resonator over the full operating range of the Bourdon tube. This approach must be used in the design of the conventional pressure transducer 30 shown in FIG. 4. The pressure transducer 30 includes a force-sensitive resonator 33 that extends between closed ends of a U-shaped Bourdon tube 35. Pressure is applied to the Bourdon tube 35 through a centrally located tubular pressure port 37 to apply a pressure-induced tensile load on the resonator 33. The structure and dimensions of the Bourdon tube 35 may be such that the Bourdon tube 35 may resonate at frequencies that are in the operating range of the resonator 33. As a result, the Bourdon tube 35 will tend to "pull" the resonant frequency of the resonator 33 toward the resonant frequency of the Bourdon tube 35 when the frequency of the resonator 33 is close to the resonant frequency of the Bourdon tube 35. The transducer 30 will then provide erroneous pressure measurement when the force applied to the resonator 33 causes it to resonate near the resonant frequency of the Bourdon tube 35. FIG. 5 is a chart that shows the deviation (error) of linearized frequency output from applied pressure over the operating pressure range of the transducer 30. The presence of a spurious structural resonance shifts the frequency in a discontinuous fashion when the force applied to the resonator 33 causes its resonant frequency to be near the resonant frequency of the Bourdon tube 35, thus limiting the accuracy of the transducer 30.

As mentioned above, Bourdon tubes have been designed so that they do not have a resonant frequency within the range of resonant frequencies of the resonator. According to this approach, the dimensions of the Bourdon tube are chosen so that any resonant frequency of the Bourdon tube is outside the resonant frequencies of the resonator over the entire operating range of the transducer. In the past, these regions that are free of overlapping resonances have been found by trial and error. However, the size of these regions decreases as the diameter of the Bourdon tube coil increases.

For this reason, the conventional approach of selecting the dimensions of Bourdon tubes by trial and error has been satisfactorily for relatively small Bourdon tubes, again, having a length of approximately 4 cm or less, but it has not proven satisfactory for transducers using larger Bourdon tubes. Although C-shaped and U-shaped Bourdon tubes are shown in FIGS. 3 and 4, respectively, it is understood that the same limitations and problems apply to other pressure-sensitive structures, such as helical tubes (including those with coil angles greater than 360 degrees) and spiral tubes.

Figure 4:
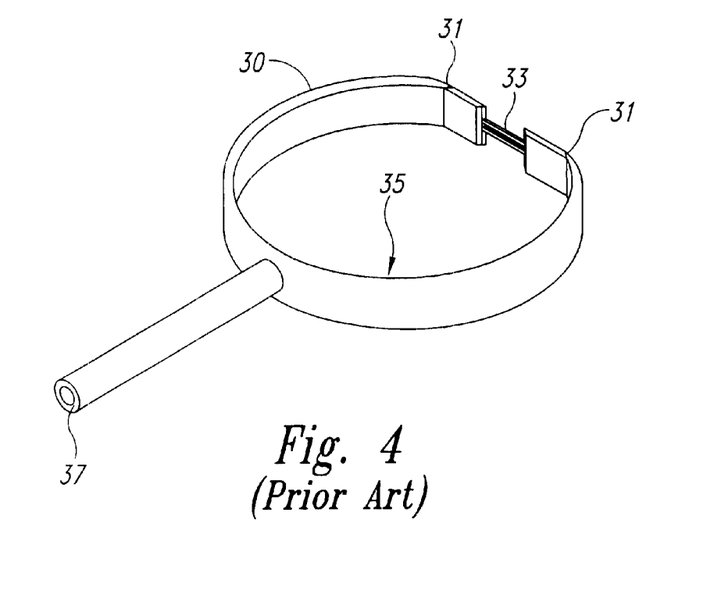
FIG. 4 is an isometric view of a portion of a conventional pressure transducer having a load-sensitive resonator mounted to a U-shaped Bourdon tube with an inlet pressure in the plane of the tube.
Figure 5:
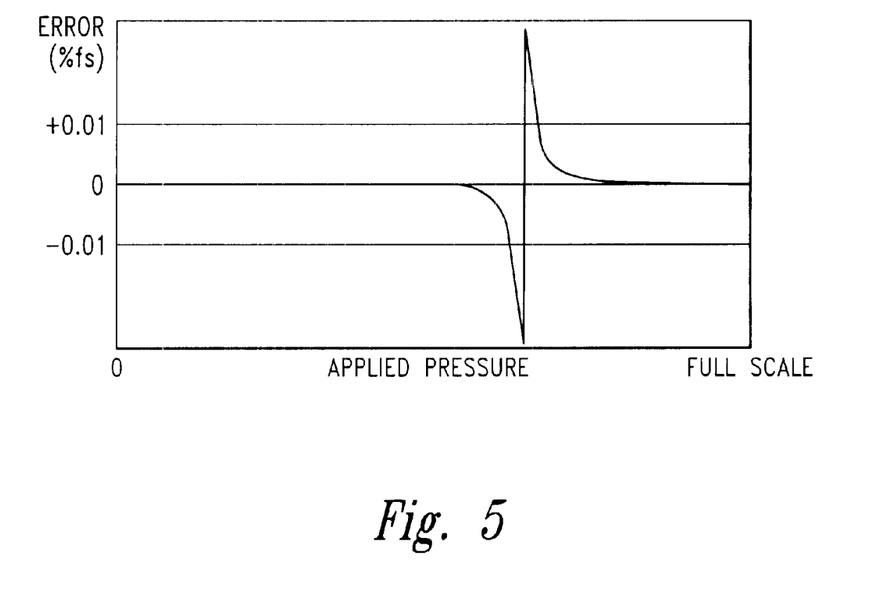
FIG. 5 is a graph showing a discontinuity in output from the transducer of FIG. 4 when a spurious structural oscillation is excited by the force-sensitive resonator within the operating pressure range of the transducer.

Another problem with the prior art transducer 30 shown in FIG. 4 is that it couples a relatively large amount of energy through a pressure port 37 to structures on which the transducer 30 is mounted. The pressure port 37 couples vibrations axially along the length of the pressure port 37 because the pressure port 37 is within the plane of the tube 37. Since the pressure port 37 is not very compliant axially, it couples energy to mounting structures with relative ease. Thus, if the Bourdon tube 35 has any resonances within the operating range of the resonator 33, the relatively large coupling of energy from the resonator 33 to the Bourdon tube 35 that is inherent in the design of the transducer 30 magnifies the severity of the above-described problem.

Figure 8:
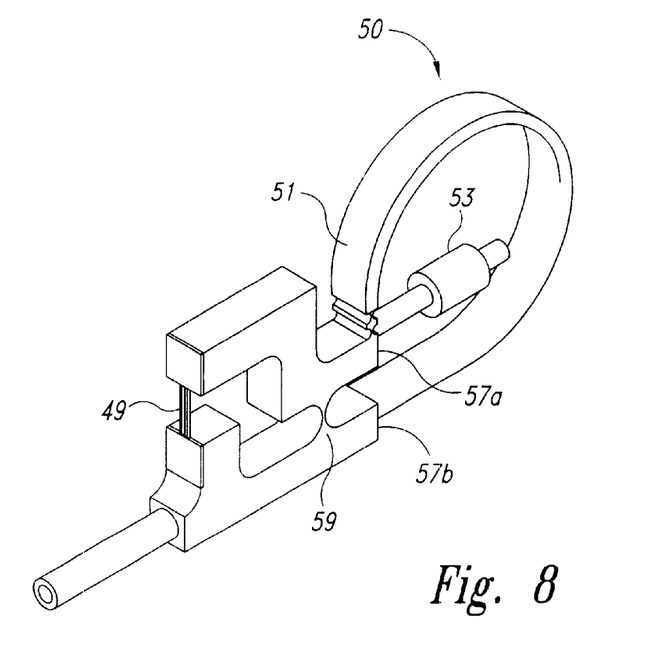
FIG. 8 is an isometric view illustrating a C-shaped Bourdon tube applying compressive loads to a load-sensitive resonator connected to a pivotally mounted suspension system. The resonator can also be mounted under tensile load at the other end of the suspension balance.

Another problem with the prior art transducer shown in FIG. 8 is that the pivotally mounted suspension arm readily transmits energy from the resonator to the Bourdon tube and base structure.

As a result of these problems and limitations, there has heretofore been no suitable technique for designing highly sensitive and accurate pressure transducers having relatively large Bourdon tubes that are free of structural resonances, and, as a result, no such transducers have been available.

SUMMARY OF THE INVENTION

A pressure transducer includes a pressure vessel receiving a differential pressure that causes the vessel to deform responsive to pressure changes. A force-sensitive resonator, such as a double-ended tuning fork, is coupled to the pressure vessel so that the force exerted on the resonator by the pressure vessel is a function of the differential pressure. The resonant frequency of the resonator is thus indicative of the magnitude of the differential pressure. According to one aspect of the invention, the pressure vessel is a curved tube having a length of at least 4 cm, and the dimensions, geometry and composition of the tube are chosen so that there are no structural resonances in the pressure vessel at any resonant frequency of the resonator throughout the operating range of the transducer. In another aspect of the invention, the pressure vessel is a Bourdon tube that deforms within a bending plane responsive to a differential pressure. An elongated pressure port coupled to the pressure vessel intersects the pressure vessel along a longitudinal axis that is substantially out of the bending plane of the pressure vessel. The pressure port is relatively compliant in the lateral direction so that relatively little energy from the resonator is transferred to a mounting structure to which the pressure port is attached. In another aspect of the invention, the Bourdon tube is attached to a pivotally mounted suspension arm and is mechanically isolated from the force-sensitive resonator by masses and springs which act as a low-pass mechanical filter.

DETAILED DESCRIPTION OF THE INVENTION

The present invention is equally applicable to load-sensitive resonators of various shapes and configurations of pressure-responsive elements; however, for simplicity and clarity, only the application to flexurally vibrating, force-sensitive single-beam and double-ended tuning fork devices attached to Bourdon tubes will be described in detail, it being understood that the same or similar principles apply in the general case. In particular, the chosen example that is illustrated with a U-shaped Bourdon tube design is readily applicable to other types of pressure-sensitive structures, including C-shaped, spiral, and helical Bourdon tubes. Furthermore, although the use of analytical solutions to eliminate output discontinuities is shown for simplicity and clarity, it is understood that numeric results can also be obtained from experiment and from numeric solutions of finite element analysis.

Figure 6:
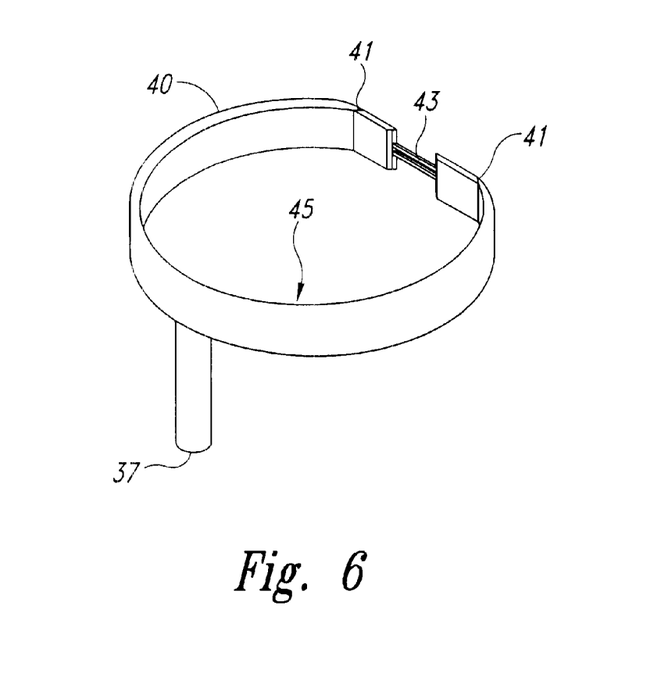
FIG. 6 is an isometric view of a pressure transducer according to one embodiment of the invention having a load-sensitive resonator mounted to a U-shaped Bourdon tube with an inlet pressure port perpendicular to the plane of the tube.

FIG. 6 illustrates a pressure transducer 40 according to one embodiment of the invention in which a force-sensitive resonator 43 extends between closed ends 41 of a U-shaped Bourdon tube 45. Pressure is applied to the Bourdon tube 45 through a tubular pressure port 47 to apply a pressure-induced tensile load on the resonator 43. Vibrations from the resonator 43 are coupled to the pressure port 47 laterally rather than axially because the pressure port 47 is perpendicular to the plane of the tube 45. The pressure port 47 is far more compliant in bending than it is compliant axially so that, compared to the prior art transducer 30 of FIG. 4, little energy from the resonator 43 is coupled to a mounting structure (not shown) to which the pressure port 47 is attached.

The Bourdon tube 45 shown in FIG. 6 has the same outward appearance as the Bourdon tube 45 shown in FIG. 4. However, according to one embodiment of the invention, the length of the Bourdon tube 45 is relatively large, i.e., greater than 4 cm. It would therefore be impractical to design the Bourdon tube 45 by trial and error to be free of resonances at any resonant frequency generated by the resonator 43 over the entire operating range of the transducer 40. However, the diameter and aspect ratio, i.e., flattening, of the tube 45 is chosen using the method described below so that the tube 45 does not resonate at the resonant frequency of the resonator 43. As a result, the transducer 40 does not exhibit any discontinuity in its measurement accuracy. It is practical to design the Bourdon tube 45 in this manner because, within practical limits of fabrication, the force that the Bourdon tube 45 applies to the resonator 43 can be increased by increasing the aspect ratio of the cross-section of the tube 45, or by decreasing the coil diameter of the tube 45. Thus, a variety of different diameters and flattening of the tube 45 are possible.

Figure 7:
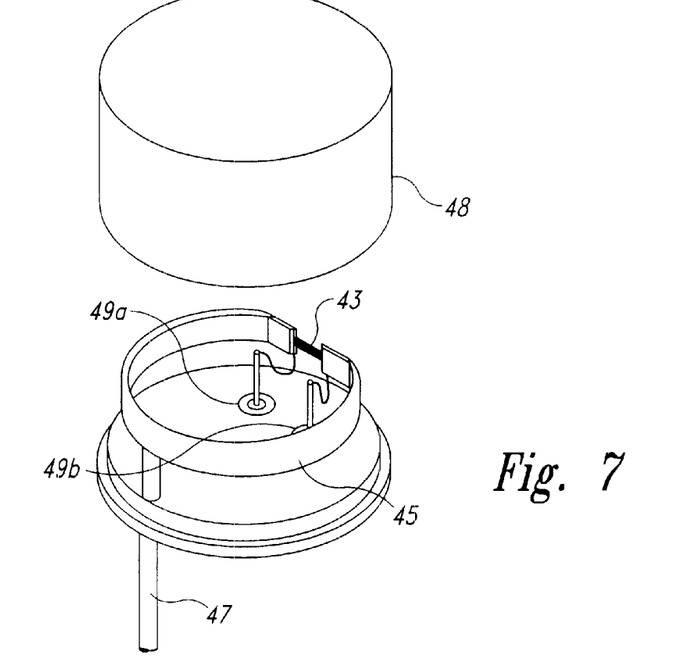
FIG. 7 is an isometric view of the pressure transducer of FIG. 6 mounted in an evacuated air-tight enclosure and having an external pressure port.

FIG. 7 illustrates the digital pressure transducer 40 mounted within an airtight enclosure 48. The interior of the Bourdon tube 45 receives external gas or fluid pressure through the pressure port 47. As explained above with reference to FIG. 6, an applied pressure generates tensile loads on the force-sensitive resonator 43, which is attached between the two closed ends of the Bourdon tube 45. The airtight enclosure 48 is preferably evacuated so that the resonator 43 mounted within the enclosure 48 measures absolute pressure. Hermetically sealed feed-through connectors 49a,b connect the leads of electrodes (not shown) mounted on the resonator 43 to external oscillator circuitry (not shown). If the Bourdon tube 45 is of a "U" configuration, then the pressure port is substantially out of the bending plane of tube 45. If the Bourdon tube 45 is of a "C" configuration, then the diameter and aspect ratio of the tube 45 is chosen so that the tube 45 does not resonate at the resonant frequency of the resonator 43 over the entire operating range of the transducer, or is pivotally mounted with a decoupling low-pass mechanical filter.

FIG. 8 illustrates a pressure transducer 50 including a C-shaped Bourdon tube 51 attached to a load-sensitive resonator 49 on a pivotally mounted suspension system 59. Again, the length of the C-shaped Bourdon tube 51 is typically greater than 4 cm, so it would not be reasonably possible to design the tube 51 to be free of spurious resonances. A pressure applied to the Bourdon tube 51 produces a compressive load on the resonator 49. A suspension system provides support and guidance in the two axes that are orthogonal to a load-sensitive axis. The resonator 49 can also be mounted on the other end of a suspension balance 57a, 57b with the effect that the applied force can be in tension. The suspension system further allows an amplification factor of the applied force by choosing appropriate lever arms of the suspension balance. A counter-balance 53 is provided to reduce the sensitivity of the transducer to orientation and acceleration.

Figure 9:
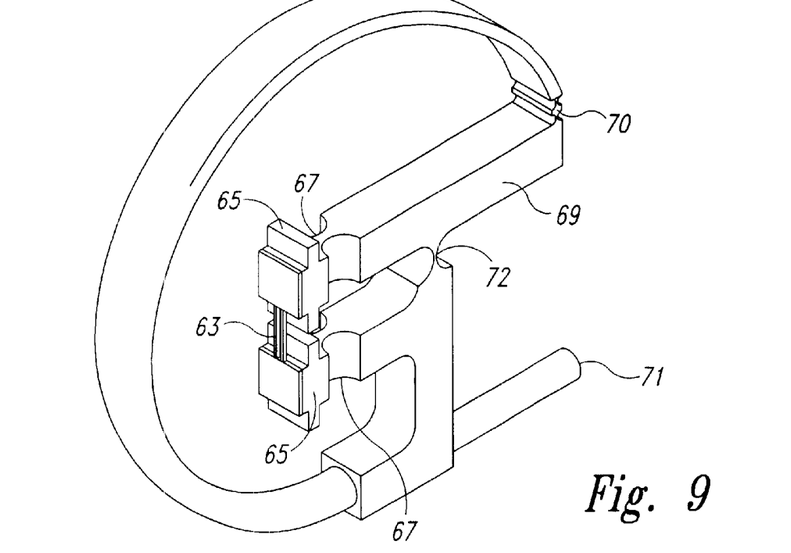
FIG. 9 is an isometric view a pressure transducer with a pivotally mounted suspension system. Illustrating one embodiment of the current invention are masses below the crystal pads that are weakly coupled to the suspension with flexure springs that act as low-pass mechanical filters.

FIG. 9 illustrates a technique to decouple any size Bourdon tube from the resonator by means of a low-pass mechanical filter. Pressure applied to port 71 generates a torque about pivot 72, which stresses resonator 63 to change its resonant frequency. Structural excitations from resonator 63 are decoupled by masses 65 and flexure springs 67 from Bourdon tube 68, which is mounted to arm 69 through flexible link 70.

Figure 10A:
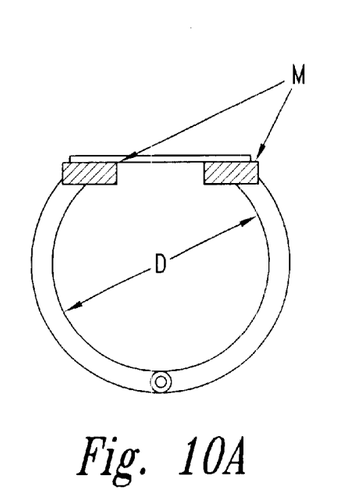
FIG. 10 is a plan view of the tubing cross section used in Bourdon tubes and plan views of a U-shaped Bourdon tube with perpendicular port and a C-shaped Bourdon tube with an attached force-sensitive resonator, with dimensional parameters defined that determine both the pressure-generating capability and the location of spurious resonant modes.
Figure 10B:
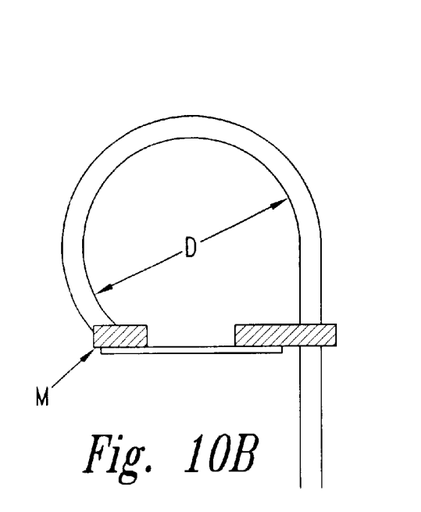
Figure 10C:
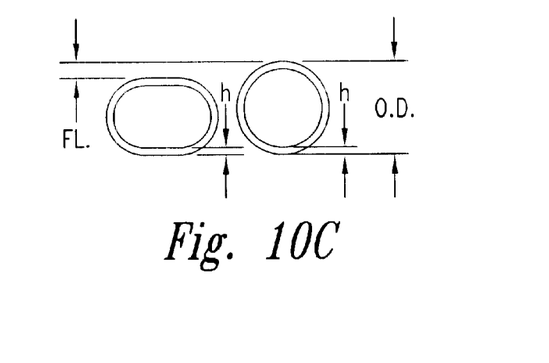

FIG. 10 illustrates a U-shaped and a C-shaped Bourdon tube with attached force-sensitive resonator having dimensional parameters defined that determine both the pressure generating capability and the isolation of spurious resonant modes. Both of these Bourdon tubes have a relatively large diameter D, i.e., on the order of 1.4 cm or greater, and the tube length is greater than 4 cm. The dimensional variables are the coil diameter, D, the amount of aspect ratio of the cross-section, FL, the tip mass, M, and tube wall thickness, h. In this embodiment, the cross-section is flattened from a round tube with outer diameter, OD. Although a circular tube is shown by way of example, it will be understood that the tube being flattened may be noncircular, such as oval, elliptical, or rectangular. In either case, the aspect ratio can be represented by the difference, or ratio, of minor to major axis.

Figure 11A:
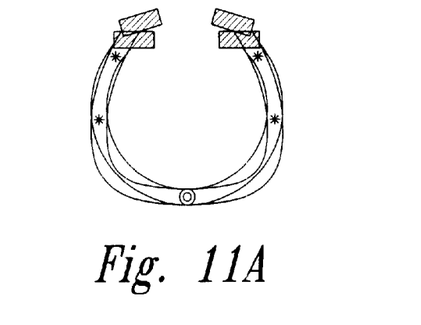
FIGS. 11A and 11B are illustrations showing the flexing of the Bourdon tube of FIG. 10 at two different times during structural resonance.

FIG. 11A is an exaggerated illustration of a structural resonance in the U-shaped Bourdon tube of FIG. 10 in the plane of the curvature. The dotted lines represent the vibrating parts at a later time. Stationary parts are called nodes. The number of nodes per half-length of the U-shaped beam determines what harmonic overtone is being excited. The illustrated example has 2 nodes per half-length, and the overtone is the 3rd symmetric harmonic with a fixed point where the pressure port enters. There are many overtones in the structure of a Bourdon tube, but the existence of an overtone is only relevant if the frequency of oscillation matches the resonant frequency or the double-frequency of the resonator.

Figure 11B:
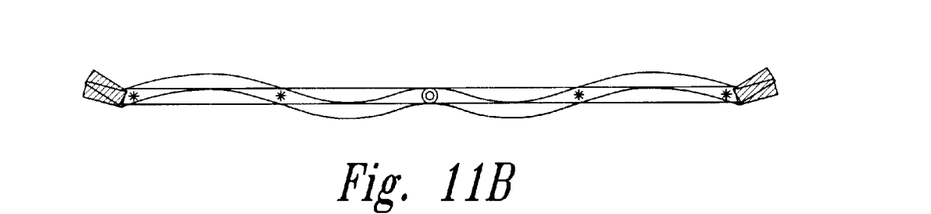

FIG. 11B is an illustration that shows how the calculation of harmonic resonances can be achieved. A tube with the same length and cross-section is straightened out into a cantilevered beam. Conventional analytic or numeric methods can be used to find the resonant structure of the straightened cantilevered beam. There are two harmonic series in the plane shown, one mirror-symmetric, and one anti-symmetric. There are also two harmonic series out-of-plane or transverse to the plane of tube curvature. Bending the tube to an angle θ changes the vibrations of the overtones slightly. Mathematically, this can be expressed as:

$fn$(curved beam)=$xn(\theta)*fn$(straight beam with tip mass)

where fn is the nth overtone of a particular harmonic series, and $xn(\theta)$ is the fractional change of the vibrations between a bent tube and a straight one for each of the overtones.

In the illustrative embodiment of this invention, there are at least 4 harmonic series that must be calculated. The first series includes all the symmetric vibrations in the plane of the curved beam. Symmetric is understood here to include those vibrations where the tips of the curved beam move 180 degrees out of phase, similar to a tuning fork mode. The second series is asymmetric with the tips moving in phase. The overtones of the asymmetric series are close to the symmetric series if the inlet of the pressure port into the U-shaped tube is fixed. The asymmetric frequencies are lowered if the inlet tube has compliance and produces a hinged boundary condition. The third and fourth series are the out-of-plane transverse modes, symmetric and asymmetric, respectively. In a more general case, the overtone series may also include torsional modes if such oscillations couple to the longitudinal double-frequency of the resonator mounts or to the transverse vibrations of the resonator.

As derived in "Dynamics of Vibrations", by Enrico Volterra, Charles E. Merrill Books, Columbus, Ohio, 1965, the frequency equation for the case of a straight beam with a fixed end (at the pressure inlet) and with a tip mass attached at the free end is:

$$1+1/(\cos kL \cos h\ kL)-\alpha(kL)(\tan kL-\tan h\ kL)=0$$

where α is the ratio of tip mass to tube mass, and L is the half-length of the U-shaped beam. Defining the modulus of elasticity of the material, E, the tube mass per unit length, μ, and the tube area moment of inertia, I, the roots of knL (n=1,2,3 . . . ) determine the harmonic frequencies as follows:

$$fn=1/(2\pi)*(knL)^2*(E*I/(\mu*L^4))^{1/2}$$

The area moment of inertia is evaluated in the plane of curvature for longitudinal resonances, and in the transverse direction, respectively, for out-of-plane resonances. A corresponding frequency equation can be derived in conventional manner for hinged tubes. The effect of bending, $xn(\theta)$, can be established from experiment or from numeric computations (finite element analysis). It tends towards unity for higher overtones, as the curvature between nodes subtends a smaller angle. Thus, the calculation for a cantilevered beam becomes a good approximation for the curved Bourdon element.

For a selected tube with fixed outer tube diameter, wall thickness, and modulus of elasticity, one can readily observe from the derived equation that the two free design parameters are aspect ratio, FL, which changes the area moment of inertia, and the Bourdon tube coil diameter, D, which determines the overall length of the tube. Thus, in the disclosed embodiments of the invention, the essential elements are that two parameters of the Bourdon tube design determine the coincident or overlapping range of the resonant frequency of the resonator, f, the double-pumped frequency of the crystal mount, 2f, and the resonant overtones of the selected Bourdon tube, fn. To prevent discontinuities in the measurement provided by the transducer, the resonator frequency f and the double frequency 2f should not coincide with the harmonic overtones of the tube.

Figure 12:
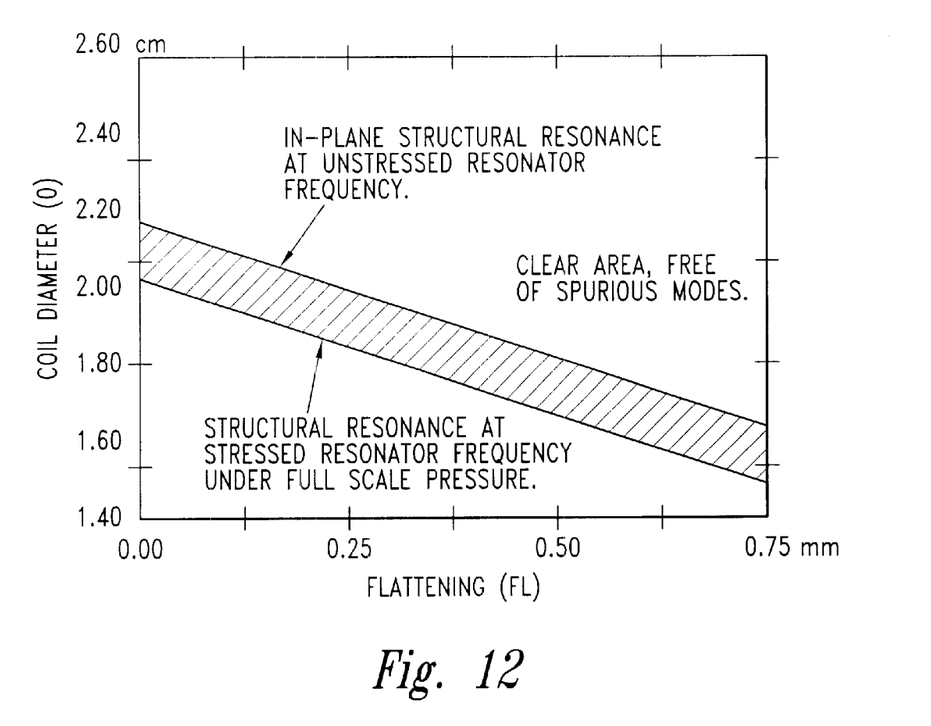
FIG. 12 is an illustrative chart that shows the values of tube aspect ratio, FL, and coil diameter, D, that produce a specific structural resonance within the frequency range of the resonator.

FIG. 12 is a simplified chart showing only the fifth symmetric in-plane harmonic overtone for a particular tube as a function of coil diameter and flattening. The width of the band is determined by the frequency changes of the resonator under full load. Tube dimensions within the shaded band will produce a resonance of the pressure-responsive element that is coincident with the frequency of the resonator within the frequency range of normal operation. Tube dimensions outside the band will produce resonator frequencies that cannot excite the fifth overtone. Thus, there cannot be interference between this particular overtone and the resonator, and the frequency change of the resonator is continuous and accurate.

Figure 13:
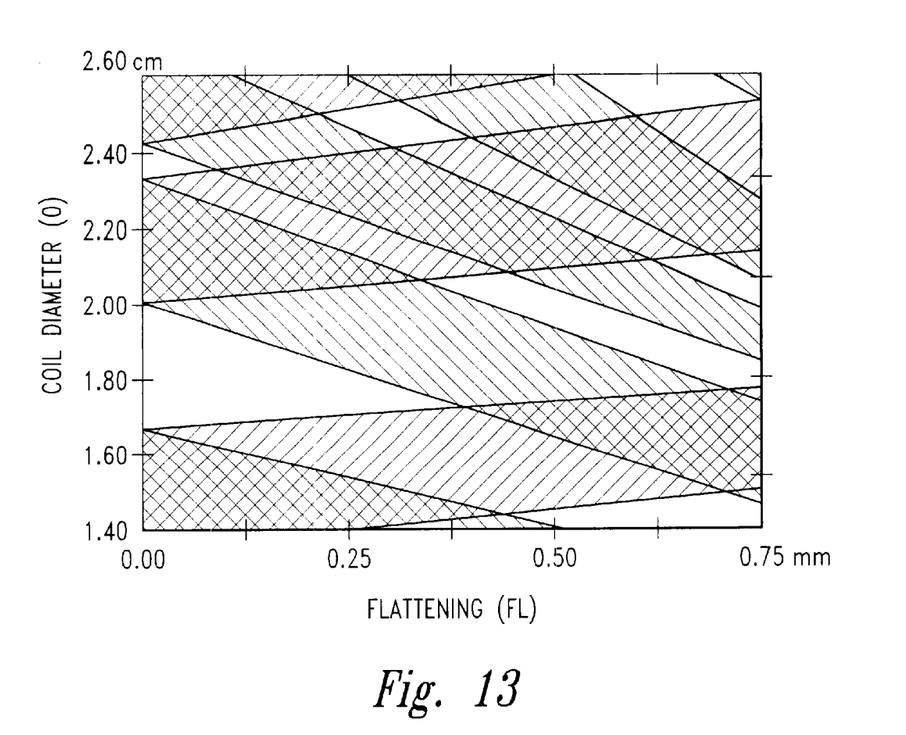
FIG. 13 is an illustration of a map showing the range of values for Bourdon tube coil diameter, D, and aspect ratio of the tube cross-section, FL, for operation of a transducer that is free of all spurious resonances.

FIG. 13 is a more complete chart that shows all the harmonic series for a tube with an outer diameter of 1.6 mm and a wall thickness of 0.15 mm. The chart is shown for coil diameters from 1.4 to 2.6 cm, which is equivalent to a tube length of 4 to 7.4 cm at the chosen arc angle, and aspect ratio or flattening from 0 to 0.75 mm. The white areas are regions without spurious modes. While the chart shown is illustrative of a specific tube, other force-producing elements have maps based on the method of this invention with regions free of spurious modes with corresponding allowed values of coil diameter and flattening. The method of eliminating output discontinuities is applicable to pressure vessels having a great variety of dimensions, designs, and resonator dimensions. The pressure vessels can vary in a variety of parameters, such as outer diameter, wall thickness, and modulus of elasticity. Other pressure vessels designs may be used, including C-shaped, U-shaped, spiraling, twisted, and helical tubes, with or without a suspension system.

Figure 14:
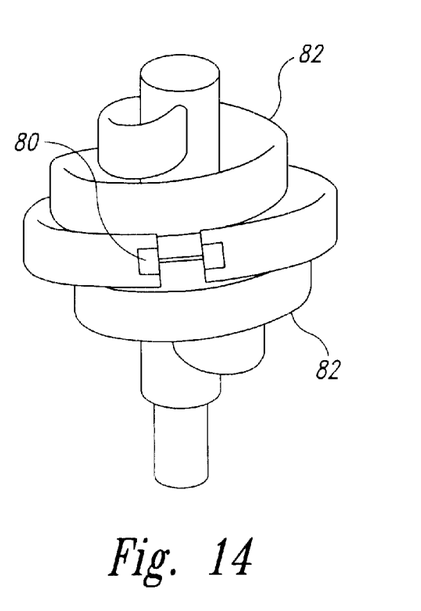
FIG. 14 is an isometric view of another embodiment of the invention using a spiral/helical tube as the pressure-responsive vessel.

A variety of transducer designs can be fabricated using the above methodology to provide good measurement capabilities without any discontinuities over the full operating ranges of the transducers. For example, as shown in FIG. 14, a force-sensitive resonator 80 is coupled to a Bourdon tube 82 of helical or spiral configuration so that the tube 82 winds and unwinds responsive to variations in differential pressure applied to the tube. The tube 82 has a length of at least 4 cm. As the tube 82 winds and unwinds, it varies the force applied to the resonator 80.

From the foregoing it will be appreciated that, although specific embodiments of the invention have been described herein for purposes of illustration, various modifications may be made without deviating from the spirit and scope of the invention. For example, although a variety of pressure vessel designs have been illustrated by way of example, it will be understood that many more designs of different configurations are possible. Accordingly, the invention is not limited except as by the appended claims.

What is claimed is:

1. A transducer for providing an electrical signal having a frequency indicative of a differential pressure, comprising:
    a force-sensitive resonator controlling the frequency of the electrical signal, the resonator having at least one resonant element connected between a pair of mounts such that its resonant frequency is dependent on the elastic properties of the resonant element and the force applied to the resonant element through the mounts so that the frequency of the electrical signal varies as a function of the force applied to the resonator through the mounts; and
    a curved resilient pressure vessel having at least one closed end and a length of at least 4 cm, the pressure vessel having an interior and an exterior between which the differential pressure is applied, the pressure vessel being coupled to the mounts of the force-sensitive resonator and having a pressure-responsive configuration so that it generates forces through the mounts whose magnitude is a function of the differential pressure and the dimensions, composition, and geometry of the pressure vessel, the dimensions, composition, and geometry of the pressure vessel being such that any structural resonant frequencies of the pressure vessel are outside the ranges of frequencies coupled to the mounts by the force-sensitive resonator.

2. The transducer of claim 1 wherein the pressure vessel comprises a curved tube of noncircular cross-section, and the mounts of the resonator are secured externally to respective spaced-apart areas of the tube.

3. The transducer of claim 1 wherein the pressure vessel comprises a curved tube of noncircular cross-section, and the mounts of the resonator are secured inside the tube to respective spaced-apart areas of the tube.

4. The transducer of claim 1 wherein the pressure vessel is formed by rounded tubes that are flattened to a non-circular, elliptical, or oval cross-section.

5. The transducer of claim 1 wherein the pressure vessel comprises a generally U-shaped configuration having ends positioned adjacent each other with the mounts of the resonator connected to the respective ends of the pressure vessel so that the stress on the resonator varies in accordance with the differential pressure.

6. The transducer of claim 1 wherein the pressure vessel comprises a generally C-shaped configuration with the mounts of the resonator connected to spaced-apart areas of the pressure vessel so that the stress on the resonator varies in accordance with the differential pressure.

7. The transducer of claim 1 wherein the pressure vessel comprises a Bourdon tube of helical configuration with the mounts of the resonator connected to spaced-apart areas of the pressure vessel so that the stress on the resonator varies in accordance with the differential pressure.

8. The transducer of claim 1 wherein the pressure vessel comprises a Bourdon tube of spiral configuration with the mounts of the resonator connected to spaced-apart areas of the pressure vessel so that the stress on the resonator varies in accordance with the differential pressure.

9. The transducer of claim 1 wherein the pressure vessel comprises a pair of arcuate members symmetrically positioned with respect to each other in opposite directions, the mounts of the resonator being connected to respective areas of the arcuate members so that the stress on the resonator varies responsive to variations in the differential pressure.

10. The transducer of claim 1 wherein the resonator comprises dual resonant beams extending between the mounts, the resonant beams being driven so that they resonate out of phase with each other.

11. The transducer of claim 1 wherein the resonator is fabricated from piezo-electric quartz.

12. The transducer of claim 1 wherein the pressure vessel comprises a curved tube of noncircular cross-section and the mounts of the resonator are secured, respectively, to an area of the tube and a fixed base.

13. The transducer of claim 1, further comprising a coupling connecting the pressure vessel to the resonator, the coupling being structured to act in a single direction generally along the load-sensitive axis of the resonator.

14. The transducer of claim 1 wherein the coupling comprises an elongated suspension arm secured to the pressure vessel and to the resonator, the suspension arm being mounted on a base through a pivot that is relatively compliant about an axis which is perpendicular to the load-sensitive axis of the resonator.

15. The transducer of claim 1 wherein the pressure vessel further comprises a port receiving a pressure for pressurizing the interior of the pressure vessel.

16. The transducer of claim 1 further comprising a sealed, evacuated enclosure in which the pressure vessel is mounted so that the transducer measures absolute pressure.

17. The transducer of claim 1 further comprising an airtight enclosure having a port to which a pressure is applied, the pressure vessel being mounted within the enclosure so that the differential pressure is proportional to the pressure.

18. The transducer of claim 1 wherein the pressure vessel is hermetically sealed and evacuated such that the transducer measures absolute pressure applied externally to the pressure vessel.

19. The transducer of claim 1 wherein:
the resonator frequency, f, varies from a minimum, fmin, to a maximum, fmax, for any value of F in the range Fmin to Fmax, where F is the force applied to the resonator between its mounts, such that the frequency of the resonator is $f=f_o\sqrt{(1+a*F)}$, where $f_o$ is the frequency of the unstressed resonator, and a is a constant which can be positive or negative depending on tensile or compressive forces applied to the mounts of the resonator, the force produced by the pressure vessel under pressure P is a function of coil diameter D of a Bourdon tube, its wall thickness H, and its flattened non-circular cross section characterized by the semi-major axis A and semi-minor axis B, wherein the force F generated is $F=PAB(1-B^2/A^2)\zeta\Gamma/(\xi+\chi^2)$, with $\chi=2DH/A^2$ and $\zeta,\xi$ being constants and $\Gamma$ being dependent on the central angle of the tube and the direction of the force, such that the choice of tubing cross section and wall thickness and variations in flattening FL and coil diameter D can control the range of the force F from Fmin to Fmax, and the frequency range of the resonator from a minimum, fmin, to a maximum, fmax;

the structural resonances of the elongated pressure vessel are denoted by fn (in-plane) and fnt (transverse to the plane of the curved pressure vessel), which are functions of the flattening parameters A and B and coil diameter D, such that variations of flattening FL and coil diameter D can control the frequencies of such structural resonances and where the constants kn and knt are determined from conventional analytic and numeric methods or from experiments, such that the structural frequencies are $fn=kn*(A*B^3/D^4)^{1/2}$ and $fnt=knt*(B*A^3/D^4)^{1/2}$; and the following inequalities hold: $f/fn\neq 1$ and $f/fnt\neq 1$, such that the frequency of the resonator is not equal to the frequency of the structural resonances for all values of the resonator frequency from a minimum, fmin, to the maximum, fmax, and $2f/fn \neq 1$ and $2f/fnt\neq 1$, such that the double-frequency of the resonator is not equal to the frequency of the structural resonances for all values of the resonator frequency.

20. A transducer for providing an electrical signal having a frequency indicative of a differential pressure, comprising:
a force-sensitive resonator controlling the frequency of the electrical signal, the resonator having at least one resonant element connected between a pair of mounts such that its resonant frequency is dependent on the elastic properties of the resonant element and the force applied to the resonant element through the mounts so that the frequency of the electrical signal varies as a function of the force applied to the resonator through the mounts;

a curved resilient pressure vessel having at least one closed end, the pressure vessel having an interior and an exterior between which the differential pressure is applied, the pressure vessel being coupled to the mounts of the force-sensitive resonator and having a pressure-responsive configuration so that it generates forces through the mounts whose magnitude is a function of the differential pressure, the pressure vessel deforming within a bending plane responsive to the differential pressure; and a n elongated pressure port coupled to the pressure vessel, the pressure port intersecting the pressure vessel along a longitudinal axis that is substantially out of the bending plane of the pressure vessel.

21. The transducer of claim 20 wherein the pressure vessel comprises a curved tube of noncircular cross-section, and the mounts of the resonator are secured externally to respective spaced-apart areas of the tube.

22. The transducer of claim 20 wherein the pressure vessel is formed by rounded tubes that are flattened to a non-circular, elliptical, or oval cross-section.

23. The transducer of claim 20 wherein the pressure vessel comprises a generally U-shaped configuration having ends positioned adjacent each other with the mounts of the resonator connected to the respective ends of the pressure vessel so that the stress on the resonator varies in accordance with the differential pressure.

24. The transducer of claim 20 wherein the pressure vessel comprises a pair of arcuate members symmetrically positioned with respect to each other in opposite directions, the mounts of the resonator being connected to respective areas of the arcuate members so that the stress on the resonator varies responsive to variations in the differential pressure.

25. The transducer of claim 20 wherein the resonator comprises dual resonant beams extending between the mounts, the resonant beams being driven so that they resonate out of phase with each other.

26. The transducer of claim 20 wherein the resonator is fabricated from piezo-electric quartz.

27. The transducer of claim 20 wherein the pressure vessel comprises a curved tube of noncircular cross-section and the mounts of the resonator are secured, respectively, to an area of the tube and a fixed base.

28. The transducer of claim 20, further comprising a coupling connecting the pressure vessel to the resonator, the coupling being structured to act in a single direction generally along the load-sensitive axis of the resonator.

29. The transducer of claim 20 further comprising a sealed, evacuated enclosure in which the pressure vessel is mounted so that the transducer measures absolute pressure.

30. The transducer of claim 20 wherein:
the resonator frequency, f, varies from a minimum, fmin, to a maximum, fmax, for any value of F in the range Fmin to Fmax, where F is the force applied to the resonator between its mounts, such that the frequency of the resonator is $f=f_o\sqrt{(1+a*F)}$, where $f_o$ is the frequency of the unstressed resonator, and a is a constant which can be positive or negative depending on tensile or compressive forces applied to the mounts of the resonator, the force produced by the pressure vessel under pressure P is a function of coil diameter D of a Bourdon tube, its wall thickness H, and its flattened non-circular cross section characterized by the semi-major axis A and semi-minor axis B, wherein the force F generated is $F=PAB(1-B^2/A^2)\zeta\Gamma/(\xi+\chi^2)$, with $\chi=2DH/A^2$ and $\zeta,\xi$ being constants and $\Gamma$ being dependent on the central angle of the tube and the direction of the force, such that the choice of tubing cross section and wall thickness and variations in flattening FL and coil diameter D can control the range of the force F from Fmin to Fmax, and the frequency range of the resonator from a minimum, fmin, to a maximum, fmax;

the structural resonances of the elongated pressure vessel are denoted by fn (in-plane) and fnt (transverse to the plane of the curved pressure vessel), which are functions of the flattening parameters A and B and coil diameter D, such that variations of flattening FL and coil diameter D can control the frequencies of such structural resonances and where the constants kn and knt are determined from conventional analytic and numeric methods or from experiments, such that the structural frequencies are $fn=kn*(A*B^3/D^4)^{1/2}$ and $fnt= knt* (B*A^3/D^4)^{1/2}$; and the following inequalities hold: $f/fn \neq 1$ and $f/fnt \neq 1$, such that the frequency of the resonator is not equal to the frequency of the structural resonances for all values of the resonator frequency from a minimum, fmin, to the maximum, fmax, and $2f/fn \neq 1$ and $2f/fnt \neq 1$, such that the double-frequency of the resonator is not equal to the frequency of the structural resonances for all values of the resonator frequency.

31. A transducer for providing an electrical signal having a frequency indicative of a differential pressure, comprising:

a force-sensitive resonator controlling the frequency of the electrical signal, the resonator having at least one resonant element connected between a pair of mounts such that its resonant frequency is dependent on the elastic properties of the resonant element and the force applied to the resonant element through the mounts so that the frequency of the electrical signal varies as a function of the force applied to the resonator through the mounts;

a curved resilient pressure vessel having at least one closed end, the pressure vessel having an interior and an exterior between which the differential pressure is applied, and having a pressure-responsive configuration so that it generates forces whose magnitude is a function of the differential pressure; and a pivotally mounted suspension arm that is connected to the pressure vessel and is mechanically isolated from the force-sensitive resonator by masses and springs which act as a low-pass mechanical filter.

32. The transducer of claim 31 wherein the pressure vessel is formed by rounded tubes that are flattened to a non-circular, elliptical, or oval cross-section.

33. The transducer of claim 31 wherein the pressure vessel comprises a generally U-shaped configuration.

34. The transducer of claim 31 wherein the pressure vessel comprises a generally C-shaped configuration.

35. The transducer of claim 31 wherein the pressure vessel comprises a Bourdon tube of helical configuration.

36. The transducer of claim 31 wherein the pressure vessel comprises a Bourdon tube of spiral configuration.

37. The transducer of claim 31 wherein the pressure vessel comprises a pair of arcuate members symmetrically positioned with respect to each other in opposite directions.

38. The transducer of claim 31 wherein the resonator comprises dual resonant beams extending between the mounts, the resonant beams being driven so that they resonate out of phase with each other.

39. The transducer of claim 31 wherein the resonator is fabricated from piezo-electric quartz.

40. The transducer of claim 31 wherein the pressure vessel further comprises a port receiving a pressure for pressurizing the interior of the pressure vessel.

41. The transducer of claim 31 further comprising a sealed, evacuated enclosure in which the pressure vessel is mounted so that the transducer measures absolute pressure.

42. The transducer of claim 31 wherein:

the resonator frequency, f, varies from a minimum, fmin, to a maximum, fmax, for any value of F in the range Fmin to Fmax, where F is the force applied to the resonator between its mounts, such that the frequency of the resonator is $f=f_o\sqrt{(1+a*F)}$, where $f_o$ is the frequency of the unstressed resonator, and a is a constant which can be positive or negative depending on tensile or compressive forces applied to the mounts of the resonator, the force produced by the pressure vessel under pressure P is a function of coil diameter D of a Bourdon tube, its wall thickness H, and its flattened non-circular cross section characterized by the semi-major axis A and semi-minor axis B, wherein the force F generated is $F=PAB(1-B^2/A^2)\zeta\Gamma(\xi+\chi^2)$, with $\chi=2DH/A^2$ and $\zeta,\xi$ being constants and $\Gamma$ being dependent on the central angle of the tube and the direction of the force, such that the choice of tubing cross section and wall thickness and variations in flattening FL and coil diameter D can control the range of the force F from Fmin to Fmax, and the frequency range of the resonator from a minimum, fmin, to a maximum, fmax;

the structural resonances of the elongated pressure vessel are denoted by fn (in-plane) and fnt (transverse to the plane of the curved pressure vessel), which are functions of the flattening parameters A and B and coil diameter D, such that variations of flattening FL and coil diameter D can control the frequencies of such structural resonances and where the constants kn and knt are determined from conventional analytic and numeric methods or from experiments, such that the structural frequencies are $fn=kn*(A*B^3/D^4)^{1/2}$ and $fnt= knt* (B*A^3/D^4)^{1/2}$; and the following inequalities hold: $f/fn \neq 1$ and $f/fnt \neq 1$, such that the frequency of the resonator is not equal to the frequency of the structural resonances for all values of the resonator frequency from a minimum, fmin, to the maximum, fmax, and $2f/fn \neq 1$ and $2f/fnt \neq 1$, such that the double-frequency of the resonator is not equal to the frequency of the structural resonances for all values of the resonator frequency.

43. A method of selecting design parameters for a pressure transducer having a curved pressure vessel that deforms responsive to a differential pressure and a force-sensitive resonator that is coupled to the pressure vessel, the method comprising selecting the dimensions, geometry and composition of the pressure vessel and the frequency range of the resonator to avoid structural resonances in the pressure vessel at any resonant frequency of the resonator throughout the operating range of the pressure transducer.

44. The method of claim 43, wherein the acts of selecting the dimensions, geometry and composition of the pressure vessel and the frequency range of the resonator comprise selecting the dimensions, geometry and composition of the pressure vessel and the frequency range of the resonator according to the following constraints:

the resonator frequency, f, varies from a minimum, fmin, to a maximum, fmax, for any value of F in the range Fmin to Fmax, where F is the force applied to the resonator between its mounts, such that the frequency of the resonator is $f=f_o\sqrt{(1+a*F)}$, where $f_o$ is the frequency of the unstressed resonator, and a is a constant which can be positive or negative depending on tensile or compressive forces applied to the mounts of the resonator, the force produced by the pressure vessel under pressure P is a function of coil diameter D of a Bourdon tube, its wall thickness H, and its flattened non-circular cross section characterized by the semi-major axis A and semi-minor axis B, wherein the force F generated is $F=PAB(1-B^2/A^2)\zeta\Gamma/(\xi+\chi^2)$, with $\chi=2DH/A^2$ and $\zeta,\xi$ being constants and $\Gamma$ being dependent on the central angle of the tube and the direction of the force, such that the choice of tubing cross section and wall thickness and variations in flattening FL and coil diameter D can control the range of the force F from Fmin to Fmax, and the frequency range of the resonator from a minimum, fmin, to a maximum, fmax;

the structural resonances of the elongated pressure vessel are denoted by fn (in-plane) and fnt (transverse to the plane of the curved pressure vessel), which are functions of the flattening parameters A and B and coil diameter D, such that variations of flattening FL and coil diameter D can control the frequencies of such structural resonances and where the constants kn and knt are determined from conventional analytic and numeric methods or from experiments, such that the structural frequencies are $fn=kn*(A*B^3/D^4)^{1/2}$ and $fnt=knt*(B*A^3/D^4)^{1/2}$; and the following inequalities hold: $f/fn \neq 1$ and $f/fnt \neq 1$, such that the frequency of the resonator is not equal to the frequency of the structural resonances for all values of the resonator frequency from a minimum, fmin, to the maximum, fmax, and $2f/fn \neq 1$ and $2f/fnt \neq 1$, such that the double-frequency of the resonator is not equal to the frequency of the structural resonances for all values of the resonator frequency.

\* \* \* \* \*